United States Patent
Vendelbo (10) Patent No.: US 12,231,858 B2
(45) Date of Patent: Feb. 18, 2025

(54) HEARING DEVICE WITH REMOTE FITTING, HEARING SYSTEM, AND RELATED METHODS

(71) Applicant: GN Hearing A/S, Ballerup (DK)

(72) Inventor: Allan Munk Vendelbo, Ballerup (DK)

(73) Assignee: GN HEARING A/S, Ballerup (DK)

(*) Notice: Subject to any disclaimer, the term of this patent is extended or adjusted under 35 U.S.C. 154(b) by 185 days.

(21) Appl. No.: 17/968,767

(22) Filed: Oct. 18, 2022

(65) Prior Publication Data
US 2023/0039340 A1     Feb. 9, 2023

Related U.S. Application Data

(63) Continuation of application No. PCT/EP2021/050082, filed on Jan. 5, 2021.

(30) Foreign Application Priority Data

Jan. 6, 2020 (EP) ..................................... 20150332

(51) Int. Cl.
*H04R 25/00* (2006.01)
*H04W 12/033* (2021.01)
*H04W 12/10* (2021.01)

(52) U.S. Cl.
CPC .......... *H04R 25/70* (2013.01); *H04W 12/033* (2021.01); *H04W 12/10* (2013.01); *H04R 2225/55* (2013.01)

(58) Field of Classification Search
CPC .. H04R 2225/55; H04R 25/70; H04R 25/505; H04R 25/55; H04R 25/558; G06F 21/44; G06F 21/64
See application file for complete search history.

(56) References Cited

U.S. PATENT DOCUMENTS

2018/0167746 A1* 6/2018 Vendelbo ............. H04R 25/505
2019/0335281 A1* 10/2019 Dickmann ........... H04R 25/556

* cited by examiner

*Primary Examiner* — Kile O Blair
(74) *Attorney, Agent, or Firm* — Vista IP Law Group, LLP (57) ABSTRACT

The present disclosure relates to methods and devices for a hearing system. A method, performed by a hearing device of a hearing system comprising a hearing device system and an external device, the hearing device system comprising the hearing device and a user accessory device with a user application installed thereon is disclosed, the method comprising receiving, from the user accessory device, secure hearing system data, the secure hearing system data comprising a data type identifier; determining a data type of the secure hearing system data based on the data type identifier; determining hearing system data by applying a security scheme to the secure hearing system data based on the data type; and operating the hearing device according to the hearing system data.

19 Claims, 4 Drawing Sheets

HEARING DEVICE WITH REMOTE FITTING, HEARING SYSTEM, AND RELATED METHODS

RELATED APPLICATION DATA

This application is a continuation of International Patent Application No. PCT/EP2021/050082 filed on Jan. 5, 2021, which claims priority to, and the benefit of, European patent application No. 20150332.3 filed on Jan. 6, 2020. The entire disclosures of the above applications are expressly incorporated by reference herein.

FIELD

The present disclosure relates to communication in a hearing system comprising an external device and a hearing device system, wherein the hearing device system comprises a hearing device and a user accessory device. In particular, the present disclosure relates to methods and devices for communication in a hearing system.

BACKGROUND

Wireless communication to and from different entities of a hearing system has been increasing in continuation of the developments within wireless communication technology. In a traditional fitting scenario, the hearing care professional (HCP) is used to have full control over the only wireless connection to the hearing device. The growing interest for allowing an HCP to perform remote fitting of a hearing device puts challenges on the hearing system both with respect to security and user friendliness.

SUMMARY

There is a need for apparatus, devices and methods for providing improved and effective security for hearing system communication including secure remote fitting of a hearing device of a hearing system. Further, there is a need for devices and methods reducing the risk of hearing device data being compromised by a third (unauthorized) party.

Accordingly a method is disclosed, the method performed by a hearing device of a hearing system comprising a hearing device system and an external device, the hearing device system comprising the hearing device and a user accessory device with a user application installed thereon, wherein the method comprises receiving, e.g. from the user accessory device, secure hearing system data, the secure hearing system data comprising a data type identifier; determining a data type of the secure hearing system data based on the data type identifier; determining hearing system data, e.g. by applying a security scheme to the secure hearing system data based on the data type; and operating the hearing device according to the hearing system data.

Further, a method is disclosed, the method performed by a user accessory device of a hearing system comprising a hearing device system and an external device, the hearing device system comprising a hearing device and the user accessory device with a user application installed thereon, wherein the method comprises obtaining hearing system data; determining a data type of the hearing system data; assigning a data type identifier; generating secure hearing system data based on the data type identifier and the hearing system data, wherein the secure hearing system data comprises the data type identifier; and transmitting the secure hearing system data to the hearing device.

Also, a method is disclosed, the method performed by a server device of a hearing system comprising a hearing device system and the server device, the hearing device system comprising a hearing device and a user accessory device with a user application installed thereon, wherein the method comprises generating fitting data for the hearing device; generating secure fitting data based on the fitting data; and transmitting the secure fitting data to the user accessory device.

A hearing device is disclosed, wherein the hearing device is configured to perform any of the methods disclosed herein and being performed by a hearing device.

The present disclosure also relates to a hearing system, the hearing system comprising a hearing device system and an external device, the hearing device system comprising a hearing device and a user accessory device with a user application installed thereon, wherein the hearing device is configured to perform any of the methods described herein and being performed by a hearing device and/or wherein the user accessory device is configured to perform any of the methods described herein and being performed by a user accessory device. The external device may be or comprise a server device configured to perform any of the methods described herein and being performed by a server device.

It is an important advantage of the present disclosure that secure remote fitting of a hearing device is provided while at the same time allowing secure user control of the hearing device via a user accessory device.

Further, the present disclosure advantageously focuses on how to ensure that hearing device data (fitting data) programmed to the hearing device can be trusted-when the HCP (fitting device) is not in direct control of the wireless link to the hearing device.

BRIEF DESCRIPTION OF THE DRAWINGS

The above and other features and advantages of the present invention will become readily apparent to those skilled in the art by the following detailed description of exemplary embodiments thereof with reference to the attached drawings, in which.

DETAILED DESCRIPTION

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

As used herein, the term "key" refers to a cryptographic key, i.e. a piece of data, (e.g. a string, a parameter) that determines a functional output of a cryptographic algorithm. For example, during encryption, the key allows a transformation of a plaintext into a cipher-text and vice versa during decryption. The key may also be used to verify a digital signature and/or a message authentication code, MAC. A key is also denoted a symmetric key when the same key is used for both encryption and decryption. In asymmetric cryptography or public key cryptography, a keying material is a key pair, also denoted a private-public key pair comprising a public key and a private key. In an asymmetric or public key cryptosystem (such as Rivest Shamir Adelman, RSA, cryptosystem), the public key is used for encryption and/or signature verification while the private key is used for decryption and/or signature generation. A hearing device key may be keying material allowing derivation of one or more symmetric keys, such as a session key and/or a certificate key for hearing device communication. Hearing device key(s) may be stored in a memory unit of the hearing device, e.g. during manufacture and/or as part of primary security settings/hearing device certificate. A hearing device key may comprise keying material that is used to derive a symmetric key. The hearing device key comprises for example an Advanced Encryption Standard, AES, key, such as an AES-128 bits key.

As used herein the term "identifier" refers to a piece of data that is used for identifying, such as for categorizing and/or uniquely identifying. The identifier may be in a form of a word, a number, a letter, a symbol, a list, an array or any combination thereof. For example, the identifier as a number may be in the form of an integer, such as unsigned integer, uint, with a length of e.g. 8 bits, 16 bits, 32 bits, etc., such as an array of unsigned integers.

A hearing system, devices thereof, and related methods are disclosed. The hearing system comprises a hearing device system and an external device, the hearing device system comprising the hearing device and a user accessory device with a user application installed thereon. The external device optionally comprises a server device and/or a fitting device. The hearing device may be a hearable or a hearing aid, wherein the processor is configured to compensate for a hearing loss of a user.

The present disclosure relates to hearing system communication between entities of a hearing system. The user accessory device forms an accessory device to the hearing device. The user accessory device is typically paired or otherwise wirelessly coupled to the hearing device. The hearing device may be a hearing aid, e.g. of the behind-the-ear (BTE) type, in-the-ear (ITE) type, in-the-canal (ITC) type, receiver-in-canal (RIC) type or receiver-in-the-ear (RITE) type. Typically, the hearing device system is in possession of and controlled by the hearing device user. The user accessory device may be a smartphone, a smartwatch or a tablet computer.

The hearing device comprises a processing unit, a memory unit and an interface. The memory unit may include removable and non-removable data storage units including, but not limited to, Read Only Memory (ROM), Random Access Memory (RAM), etc. The hearing device may comprise a processing unit configured to compensate for hearing loss of a user of the hearing device. The interface may comprise a wireless transceiver, e.g. configured for wireless communication at frequencies in the range from 2.4 to 2.5 GHZ. In one or more exemplary hearing devices, the interface is configured for communication, such as wireless communication, with a user accessory device and/or another hearing device, respectively comprising a wireless transceiver configured to receive and/or transmit data. The hearing device is configured for wireless communication with one or more devices, such as with another hearing device, e.g. as part of a binaural hearing system, and/or with one or more user accessory devices, such as a smartphone and/or a smart watch.

The method performed by the hearing device comprises receiving, from the user accessory device, secure hearing system data, the secure hearing system data comprising a data type identifier. The data type identifier is indicative of the data type of the secure hearing system data, i.e. which data are included in the secure hearing system data. The secure hearing system data may comprise secure hearing device data and/or secure control data. Hearing device data includes data that define the configuration and/or settings of the hearing device, also denoted or including fitting data. Control data are used for controlling the hearing device with the user accessory device during normal operation of the hearing device, e.g. when the hearing device performs hearing compensation for a user. Thus, control data may be indicative of one or more of volume adjustment (up/down), program selection, mode selection, and user feedback on the operation of the hearing device. The user feedback may be indicative of a user's evaluation of the operation the hearing device, e.g. one or more of "good/better", "bad/worse", and "neutral".

The hearing device data may comprise firmware or firmware updates. The hearing device data may comprise hearing device settings (fitting data) for the hearing device. The hearing device data may comprise a hearing device identifier, one or more key identifiers, one or more addresses and/or address identifiers.

The method performed by the hearing device comprises determining a data type, e.g. from a plurality of data types, of the secure hearing system data based on the data type identifier. The plurality of data types may include a first data type associated with hearing device data, such as fitting data. The plurality of data types may include a second data type associated with control data for control of the hearing device.

The method performed by the hearing device comprises determining hearing system data by applying a security scheme to the secure hearing system data based on the data type. A security scheme may comprise an integrity verification scheme and/or a decryption scheme. Applying a security scheme to the secure hearing system based on the data type may comprise applying an integrity verification scheme and/or a decryption scheme, e.g. based on one or more keys stored in memory unit of the hearing device.

The method performed by the hearing device comprises operating the hearing device according to the hearing system data.

Operating the hearing device according to the hearing system data may comprise updating hearing device settings based on the hearing device data, e.g. by storing the hearing device data, such as one or more filter settings/coefficients, gain settings/coefficients, program settings, etc. in the memory unit of the hearing device. Thus, secure remote fitting of the hearing device is provided.

Operating the hearing device according to the hearing system data may comprise controlling the hearing device according to control data of the hearing system data, e.g. by adjusting one or more operating parameters, such as volume and/or program, in accordance with the control data.

In one or more exemplary methods performed by the hearing device, applying a security scheme to the secure hearing system data based on the data type comprises applying a first security scheme in accordance with the data type being a first data type, e.g. based on a first key stored in the memory unit of the hearing device. The first key may be a hearing device data key, i.e. a key for verification/decryption of hearing device data from an external device, e.g. a fitting device and/or a server device. Thereby is ensured that even if a third party gains control of the user accessory device communication, the hearing device data are still secure/protected. Thus, a third party is prevented from changing or altering hearing device data by simply gaining control of the user accessory device, in turn preventing the hearing device from operating according to potentially harmful hearing device settings.

In one or more exemplary methods performed by the hearing device, the first security scheme comprises a first integrity verification scheme and/or a first decryption scheme. The first integrity verification scheme may be based on the first key and/or a first signature. The first decryption scheme may be based on the first key and/or a first signature. The first key may be stored as part of a certificate comprising a (digital) signature in the memory unit.

In one or more exemplary methods performed by the hearing device, applying a security scheme to the secure hearing system data based on the data type comprises applying a second security scheme in accordance with the data type being a second data type, e.g. different from the first data type. The second security scheme may be based on a second key stored in memory of the hearing device. The second key may be a communication key, e.g. for setting up and operating a secure link (application layer link) between the hearing device and the user accessory device/user application. Thus, the second key may be communication key or an application layer key for securing, e.g. verification and/or decryption of, communication from the user accessory device.

In one or more exemplary methods performed by the hearing device, the second security scheme comprises a second integrity verification scheme and/or a second decryption scheme. The second integrity verification scheme may be based on the second key and/or a second signature. The second decryption scheme may be based on the second key and/or a second signature.

In one or more exemplary methods performed by the hearing device, the first security scheme comprises the second integrity verification scheme and/or the second decryption scheme. In one or more exemplary methods performed by the hearing device, the second security scheme is different from the first security scheme.

Thereby, a simple security scheme may be applied to control data for the hearing device while a more complex and secure security scheme may be applied to hearing device data which have a larger potential to hurt the user, and therefore requires a higher security level. At the same time a too complex security scheme will drain the battery power and result in a poorly performing hearing device.

In one or more exemplary methods performed by the hearing device, determining a data type of the secure hearing system data comprises selecting the data type from a set of data types including a first data type and a second data type. The first data type may be indicative of hearing device data, such as fitting data, and/or the second data type may be indicative of control data for the hearing device. Control data are used for interactive adjustments, by a user using the user application, of the hearing device during normal use of the hearing device. Hearing device data/fitting data comprise data defining one or more baseline settings of the hearing device, such as one or more maximum gains, one or more hearing loss parameters of the user, and/or filter coefficients set by the HCP and/or the hearing device manufacturer. Fitting data optionally comprises one or more of fitting software data, fitting parameter data, and remote live fitting data. In other words, the hearing device data are used in the setup of the hearing device and may be used during initialization/startup of the hearing device. Fitting data may comprise one or more of filter settings/coefficients, gain settings/coefficients, and program settings.

In one or more exemplary methods performed by the hearing device, operating the hearing device according to the hearing system data comprises storing, e.g. in memory unit such as a fitting part of a memory module of the hearing device, fitting data/hearing device data of the hearing system data when the data type is of a first type indicative of fitting data/hearing device data.

In one or more exemplary methods performed by the hearing device, operating the hearing device according to the hearing system data comprises operating control parameters, e.g. adjusting volume, selecting program/mode, of the hearing device according to control data of the hearing system data when the data type is of a second type indicative of control data. In other words, a simple yet effective second security scheme may be applied during normal hearing device operation where control data are used to perform daily-use control of the use of the hearing device, while more fundamental changes to the hearing device is secured by a first security scheme with larger security than the second security scheme in turn leading to effective and secure daily use while providing secure updates to the hearing device settings.

The present disclosure also relates to a method, performed by a user accessory device of a hearing system comprising a hearing device system and an external device, the hearing device system comprising a hearing device and the user accessory device with a user application installed thereon.

The method performed by the user accessory device comprises obtaining hearing system data, e.g. via a user interface of the user accessory device and/or from an external device via wireless transceiver configured to receive and/or transmit hearing system data.

The method performed by the user accessory device comprises determining a data type of the hearing system data and assigning a data type identifier optionally to the secure hearing system data, e.g. according to the data type.

In one or more exemplary methods performed by the user accessory device, assigning a data type identifier comprises assigning a first data type identifier in accordance with the data type of the hearing system data being of a first data type, such as hearing device data.

In one or more exemplary methods performed by the user accessory device, assigning a data type identifier comprises assigning a second data type identifier in accordance with the data type of the hearing system data being of a second data type, such as control data of the hearing device.

The method performed by the user accessory device comprises generating secure hearing system data based on the data type identifier and the hearing system data, wherein the secure hearing system data comprises or is at least indicative of the data type identifier. In one or more exemplary methods, generating secure hearing system data based on the data type identifier and the hearing system data comprises relaying the secure hearing system data from the user accessory device in accordance with the data type being a first data type.

The method performed by the user accessory device comprises transmitting the secure hearing system data to the hearing device.

In one or more exemplary methods performed by the user accessory device, generating secure hearing system data based on the data type identifier and the hearing system data comprises applying a first security scheme in accordance with the data type being a first data type.

In one or more exemplary methods performed by the user accessory device, generating secure hearing system data based on the data type identifier and the hearing system data comprises relaying the obtained hearing system data in accordance with the data type being a first data type together with the first data type identifier. In this case, the obtained hearing system data may already be secured, e.g. by external device using the first key, before being transmitted from the external device.

In one or more exemplary methods performed by the user accessory device, the first security scheme comprises a first integrity protection scheme and/or a first encryption scheme.

In one or more exemplary methods performed by the user accessory device, generating secure hearing system data based on the data type identifier and the hearing system data comprises applying a second security scheme in accordance with the data type being a second data type. The second security scheme may be based on a second key stored in memory of the user accessory device. The second key may be a communication key, e.g. for setting up and operating a secure, e.g. integrity-protected and/or encrypted, link between the hearing device and the user accessory device/user application. Thus, the second key may be a key for securing, such as integrity protection and/or encryption of, communication from the user accessory device.

In one or more exemplary methods performed by the user accessory device, the second security scheme comprises a second integrity protection scheme and/or a second encryption scheme. The second integrity protection scheme may be based on the second key stored in memory of the user accessory device. The second encryption scheme may be based on the second key stored in memory of the user accessory device.

In one or more exemplary methods performed by the user accessory device, the first security scheme comprises the second integrity protection scheme and/or the second encryption scheme.

In one or more exemplary methods performed by the user accessory device, the second security scheme is different from the first security scheme.

Further, a method performed by a server device of a hearing system is disclosed, the hearing system comprising a hearing device system and the server device, the hearing device system comprising a hearing device and a user accessory device with a user application installed thereon. The method performed by a server device of a hearing system comprises generating fitting data/hearing device data for the hearing device; generating secure fitting data/hearing device data based on the fitting data/hearing device data, e.g. using a first key stored in the server device; and transmitting the secure fitting data/hearing device data to the user accessory device.

Further, a hearing system comprising a hearing device system and an external device is disclosed, the hearing device system comprising a hearing device and a user accessory device with a user application installed thereon, wherein the hearing device is configured to perform any of the methods described herein and being performed by a hearing device and/or wherein the user accessory device is configured to perform any of the methods described herein and being performed by a user accessory device. The external device may be or comprise a server device configured to perform any of the methods described herein and being performed by a server device.

The present disclosure enables a hearing device to be operating in a mix between fitting mode and normal mode. The hearing device can maintain a normal authenticated and/or encrypted link to the user accessory device (for control data), while at the same time being able to handle authenticated and/or encrypted hearing device data from and/or to the external device/HCP/server device.

Thereby, the user accessory device would not know how to encrypt/decrypt the hearing device data, but the user accessory device can write the secured hearing device data received from the HCP to this characteristic, in turn providing secure hearing system communication.

Figure 1:
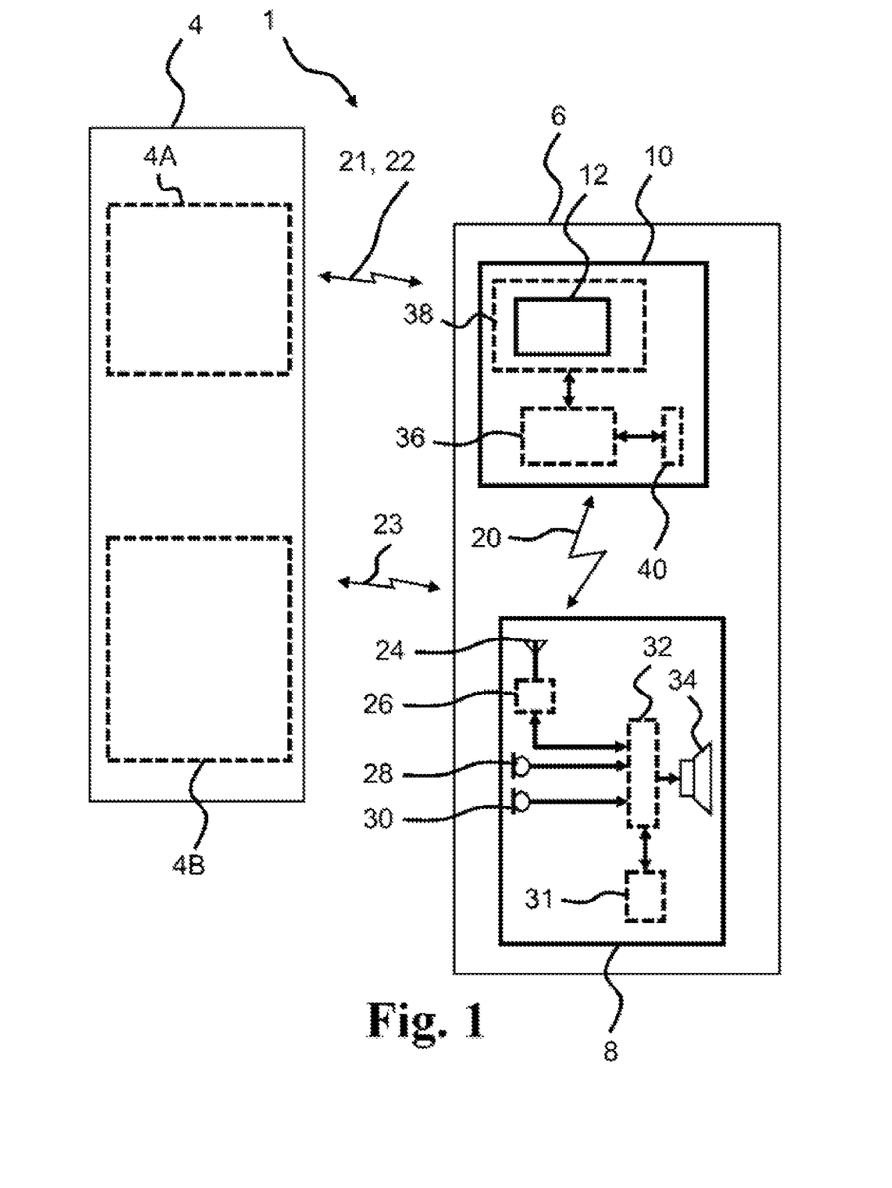
FIG. 1 schematically illustrates an exemplary hearing system.

FIG. 1 schematically illustrates an exemplary hearing system 1 comprising a hearing device system 6 and an external device 4. The hearing device system 6 comprising a hearing device 8 and a user accessory device 10 with a user application 12 installed thereon. The hearing device 8 is configured to perform any of the methods described herein, optionally being performed by a hearing device 8 and/or optionally wherein the user accessory device 10 is configured to perform any of the methods described herein and optionally being performed by a user accessory device 10.

In one or more exemplary methods and/or hearing systems the external device 4 may be or comprise a server device 4A configured to perform any of the methods described herein and being performed by a server device 4A.

The hearing system 1 may comprise a fitting device 4B. The user accessory device 10 may be a handheld device such as smartphone or smartwatch configured to wirelessly communicate with the hearing device 8. The user application 12 may be for controlling the hearing device 8 and/or assisting a hearing device user wearing/using the hearing device 8. In one or more exemplary user applications, the user application 12 is configured to transfer configuration data also denoted hearing device data (e.g. hearing device settings or fitting parameters), to the hearing device. The accessory device 10 may comprise a processing unit 36, a memory unit 38, and an interface 40.

The hearing device 8 may comprise an antenna 24 and a radio transceiver 26 coupled to the antenna 24 for receiving/transmitting wireless communication including first communication link 20. The hearing device 8 may comprise a set of microphones comprising a first microphone 28 and optionally a second microphone 30 for provision of respective first and second microphone input signals. The hearing device 8 may be a single-microphone hearing device. The hearing device 8 may comprise a memory unit 31 connected to the processing unit 32, wherein configuration data, e.g. fitting or hearing device settings may be stored in the memory unit 31.

The hearing device 8 may comprise a processing unit 32 connected to the transceiver 26 and microphones 28, 30 for receiving and processing input signals. The processing unit 32 may be configured to compensate for a hearing loss of a user based on hearing device settings and to provide an electrical output signal based on the input signals. A receiver 34 may convert the electrical output signal to an audio output signal to be directed towards an eardrum of the hearing device user.

The hearing device system 6 may be capable of communicating with the external device 4, e.g. the server device 4A through a second communication link 22. The hearing device 8 may be capable of communicating with the accessory device 10 through a first communication link 20. in an embodiment, the fitting device 4B is configured for communicating with the accessory device 10 via communication link 23 and the hearing aid device is configured for communication with the accessory device 10 via first communication link 20.

In an embodiment, the external device, e.g. the server device 4A is configured to communicate with the hearing device system 6, such as with the accessory device 10, and/or optionally the hearing device 8, via communication link 21.

Figure 2:
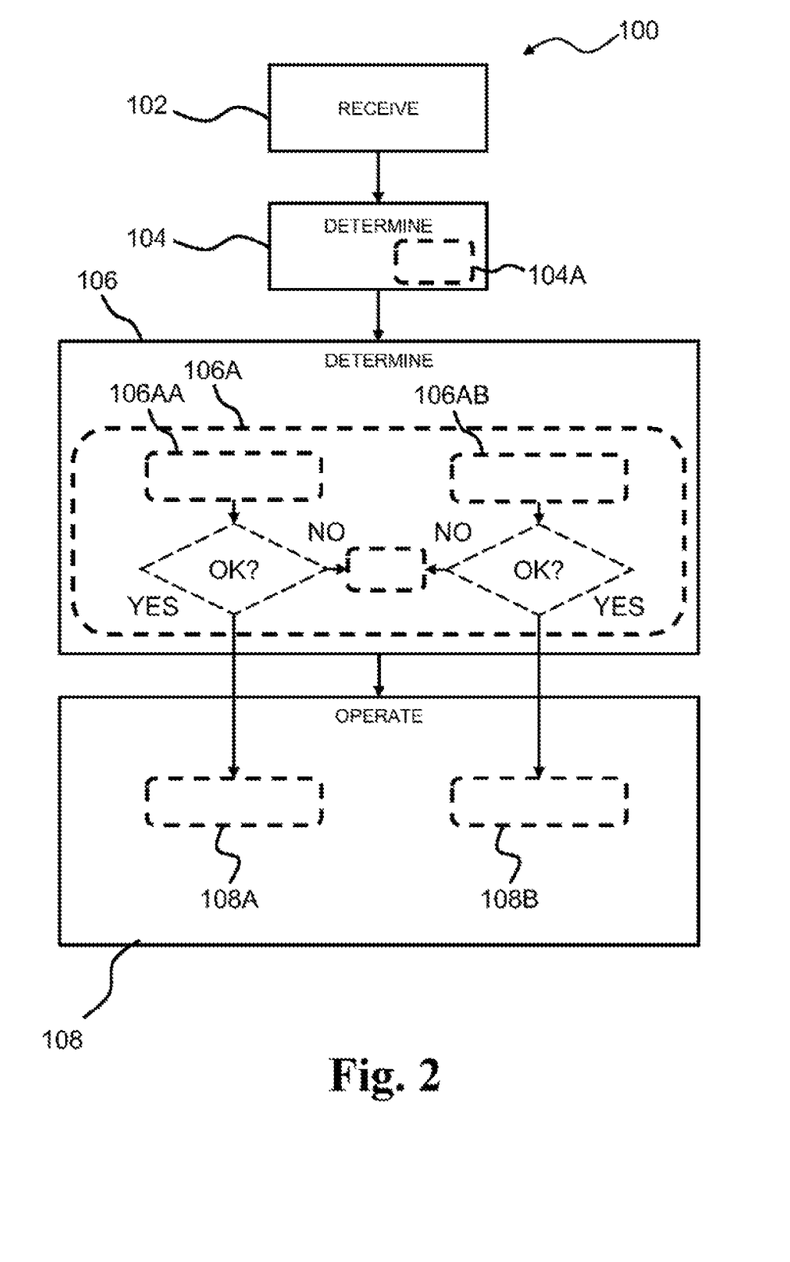
FIG. 2 is a flow chart of an exemplary method according to the disclosure performed by a hearing device of a hearing system.

FIG. 2 is a flow diagram of an exemplary method according to the disclosure. The method 100 being performed by a hearing device of a hearing system comprising a hearing device system and an external device. The hearing device system comprises the hearing device and a user accessory device with a user application installed thereon.

The method 100 comprises receiving 102, from the user accessory device, secure hearing system data, the secure hearing system data comprising a data type identifier.

The method 100 comprises determining 104 a data type of the secure hearing system data based on the data type identifier.

In one or more exemplary methods and/or hearing systems, determining 104 a data type of the secure hearing system data comprises selecting 104A the data type from a set of data types including a first data type and a second data type.

In one or more exemplary methods and/or hearing systems, the first data type is indicative of fitting data, such as one or more of filter settings, gain settings and program settings, and the second data type is indicative of control data such as volume control, program control, etc.

The method 100 comprises determining 106 hearing system data, optionally by applying 106A a security scheme to the secure hearing system data based on the data type. In other words, the data type may be used to determine which security scheme, e.g. from a plurality of security schemes, to apply to the secure hearing system data for determining hearing system data.

In one or more exemplary methods and/or hearing systems, applying 106A a security scheme to the secure hearing system data based on the data type comprises applying 106AA a first security scheme in accordance with the data type being a first data type.

In one or more exemplary methods and/or hearing systems, the first security scheme comprises a first integrity verification scheme and/or a first decryption scheme, e.g. based on a first key stored in the memory unit of the hearing device.

In one or more exemplary methods and/or hearing systems, applying 106A a security scheme to the secure hearing system data based on the data type comprises applying 106AB a second security scheme in accordance with the data type being a second data type.

In one or more exemplary methods and/or hearing systems, the second security scheme is different from the first security scheme. For example, the first security scheme may be a high-security scheme and the second security scheme may be a low-security scheme.

The first security scheme may have a higher security level than the second security scheme. A second security scheme having less security than the first security scheme may allow power-efficient daily control of the hearing device during normal use and at the same time ensuring a high-security level, e.g. during remote fitting of the hearing device. Thus, a power-efficient hearing device with high fitting security is provided.

In one or more exemplary methods and/or hearing systems, the second security scheme comprises a second integrity verification scheme and/or a second decryption scheme.

In one or more exemplary methods and/or hearing systems, the first security scheme comprises the second integrity verification scheme and/or the second decryption scheme. The method 100 comprises operating 108 the hearing device according to the hearing system data. Operating 108 the hearing device according to the hearing system data optionally comprises storing 108A, in a fitting part of a memory module of the hearing device, fitting data of the hearing system data when the data type is of a first type indicative of the fitting data.

In one or more exemplary methods and/or hearing systems, operating 108 the hearing device according to the hearing system data comprises operating 108B control parameters of the hearing device according to control data of the hearing system data when the data type is of a second type indicative of the control data. Operating control parameters may comprise turning the volume up/down and/or switch program on the hearing device.

Figure 3:
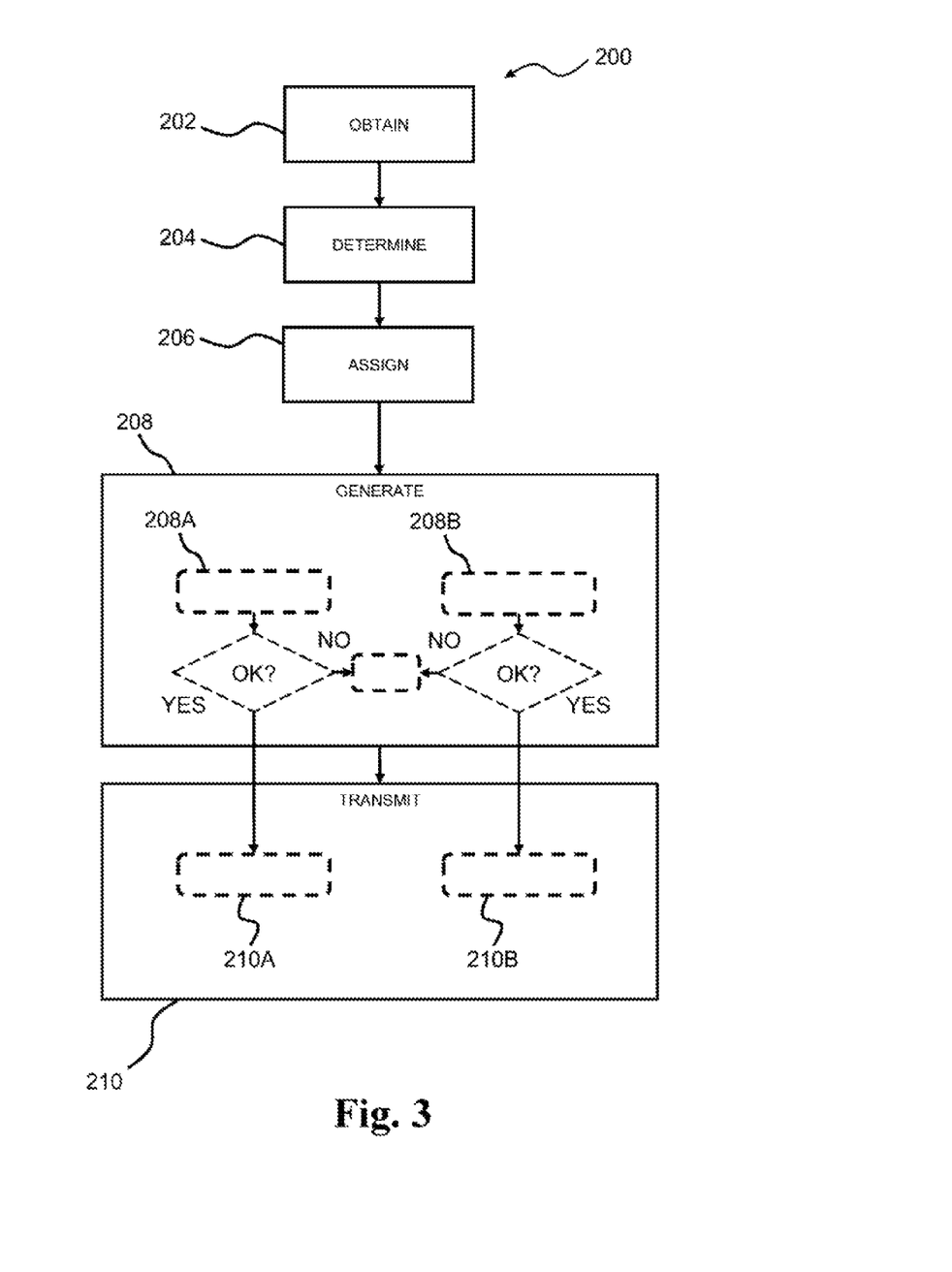
FIG. 3 is a flow chart of an exemplary method according to the disclosure performed by a user accessory device.

FIG. 3 is a flow diagram of an exemplary method according to the disclosure. The method 200 is performed by a user accessory device of a hearing system comprising a hearing device system and an external device, the hearing device system comprising a hearing device and the user accessory device with a user application installed thereon.

The method 200 comprises obtaining 202 hearing system data optionally comprising fitting data for adjusting hearing device settings and/or control data for adjusting normal operating of the hearing device.

The method 200 comprises determining 204 a data type of the hearing system data and assigning 206 a data type identifier corresponding to the data type of the hearing system data.

The method 200 comprises generating 208 secure hearing system data based on the data type identifier and the hearing system data, wherein the secure hearing system data comprises the data type identifier.

In one or more exemplary methods and/or hearing systems, generating 208 secure hearing system data based on the data type identifier and the hearing system data comprises applying 208A a first security scheme in accordance with the data type being a first data type.

In one or more exemplary methods and/or hearing systems, the first security scheme comprises a first integrity protection scheme and/or a first encryption scheme.

In one or more exemplary methods and/or hearing systems, generating 208 secure hearing system data based on the data type identifier and the hearing system data comprises applying 208B a second security scheme in accordance with the data type being a second data type.

In one or more exemplary methods and/or hearing systems, the second security scheme comprises a second integrity protection scheme and/or a second encryption scheme.

In one or more exemplary methods and/or hearing systems, the first security scheme comprises the second integrity protection scheme and/or the second encryption scheme.

In one or more exemplary methods and/or hearing systems, the second security scheme is different from the first security scheme. For example, the second security scheme may have a lower security level (thus using less power) than the first security scheme in turn providing a power-effective but yet secure hearing device operation for less security-sensitive hearing system data while enabling a high security level when communication of highly sensitive hearing system data is required.

The method 200 comprises transmitting 210 the secure hearing system data to the hearing device.

Figure 4:
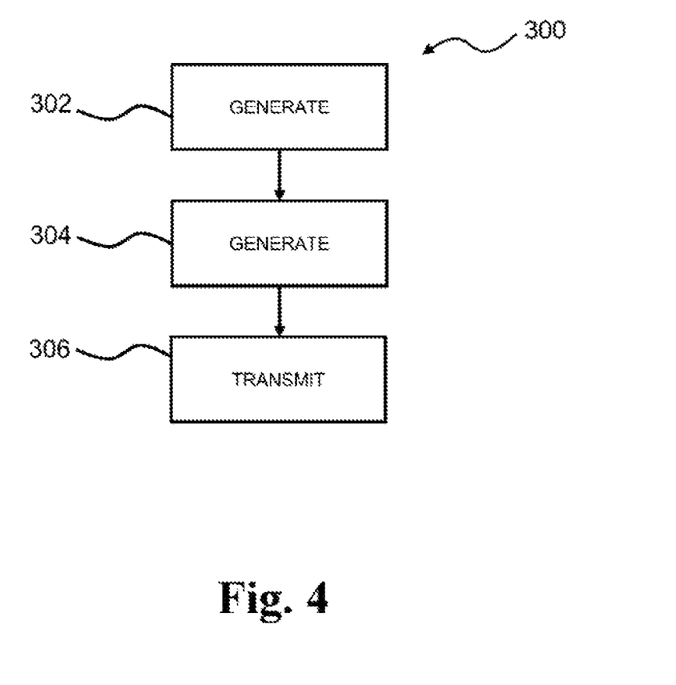
FIG. 4 is a flow chart of an exemplary method according to the disclosure performed by a server device of a hearing system.

FIG. 4 is a flow chart of an exemplary method according to the disclosure. The method 300 is performed by a server device of a hearing system comprising a hearing device system and the server device, the hearing device system comprising a hearing device and a user accessory device with a user application installed thereon.

The method 300 comprises generating 302 fitting data for the hearing device. The method 300 comprises generating 304 secure fitting data based on the fitting data optionally by applying a first security scheme e.g. using a first key optionally stored in the server device.

The method 300 comprises transmitting 306 the secure fitting data to the user accessory device.

The presents disclosure relates to methods and systems according to any of the following items.

Item 1. A method, performed by a hearing device of a hearing system comprising a hearing device system and an external device, the hearing device system comprising the hearing device and a user accessory device with a user application installed thereon, the method comprising:
receiving, from the user accessory device, secure hearing system data, the secure hearing system data comprising a data type identifier;
determining a data type of the secure hearing system data based on the data type identifier;
determining hearing system data by applying a security scheme to the secure hearing system data based on the data type; and
operating the hearing device according to the hearing system data.

Item 2. Method according to item 1, wherein applying a security scheme to the secure hearing system data based on the data type comprises applying a first security scheme in accordance with the data type being a first data type.

Item 3. Method according to item 2, wherein the first security scheme comprises a first integrity verification scheme and/or a first decryption scheme.

Item 4. Method according to any of items 1-3, wherein applying a security scheme to the secure hearing system data based on the data type comprises applying a second security scheme in accordance with the data type being a second data type.

Item 5. Method according to item 4, wherein the second security scheme comprises a second integrity verification scheme and/or a second decryption scheme.

Item 6. Method according to item 5 as dependent on item 2, wherein the first security scheme comprises the second integrity verification scheme and/or the second decryption scheme Item 7. Method according to any of items 1-6, wherein determining a data type of the secure hearing system data comprises selecting the data type from a set of data types including a first data type and a second data type.

Item 8. Method according to item 7, wherein the first data type is indicative of fitting data and the second data type is indicative of control data.

Item 9. Method according to any of items 1-8, wherein operating the hearing device according to the hearing system data comprises storing, in a fitting part of a memory module of the hearing device, fitting data of the hearing system data when the data type is of a first type indicative of the fitting data.

Item 10. Method according to any of items 1-9, wherein operating the hearing device according to the hearing system data comprises operating control parameters of the hearing device according to control data of the hearing system data when the data type is of a second type indicative of the control data.

Item 11. Method according to any of items—1-10 as dependent on items 2 and 4, wherein the second security scheme is different from the first security scheme.

Item 12. A method, performed by a user accessory device of a hearing system comprising a hearing device system and an external device, the hearing device system comprising a hearing device and the user accessory device with a user application installed thereon, the method comprising:
obtaining hearing system data;
determining a data type of the hearing system data;
assigning a data type identifier;
generating secure hearing system data based on the data type identifier and the Item hearing system data, wherein the secure hearing system data comprises the data type identifier; and
transmitting the secure hearing system data to the hearing device.

Item 13. Method according to item 12, wherein generating secure hearing system data based on the data type identifier and the hearing system data comprises applying a first security scheme in accordance with the data type being a first data type.

Item 14. Method according to item 13, wherein the first security scheme comprises a first integrity protection scheme and/or a first encryption scheme.

Item 15. Method according to any of items 12-14, wherein generating secure hearing system data based on the data type identifier and the hearing system data comprises applying a second security scheme in accordance with the data type being a second data type.

Item 16. Method according to item 15, wherein the second security scheme comprises a second integrity protection scheme and/or a second encryption scheme.

Item 17. Method according to item 16 as dependent on item 13, wherein the first security scheme comprises the second integrity protection scheme and/or the second encryption scheme.

Item 18. Method according to any of items 12-17 as dependent on items 13 and 15, wherein the second security scheme is different from the first security scheme.

Item 19. A method, performed by a server device of a hearing system comprising a hearing device system and the server device, the hearing device system comprising a hearing device and a user accessory device with a user application installed thereon, the method comprising:
generating fitting data for the hearing device;
generating secure fitting data based on the fitting data; and
transmitting the secure fitting data to the user accessory device.

Item 20. A hearing system comprising a hearing device system and an external device, the hearing device system comprising a hearing device and a user accessory device with a user application installed thereon, wherein the hearing device is configured to perform any of the methods of items 1-11.

Item 21. Hearing system according to item 20, wherein the user accessory device is configured to perform any of the methods of items 12-18.

Item 22. Hearing system according to any of items 20-21, wherein the external device is a server device configured to perform the method of item 19.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-4 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented.

Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES 2 hearing system
4 external device
6 hearing device system
8 hearing device
10 user accessory device
12 user application
20 first communication link
21 communication link
22 second communication link
23 communication link
24 antenna
26 radio transceiver
28 first microphone
30 second microphone
32 processing unit
34 receiver
36 processing unit
38 memory unit
40 interface
100 method performed by a hearing device of a hearing system comprising a hearing device system and an external device
102 receiving, from the user accessory device, secure hearing system data, the secure hearing system data comprising a data type identifier
104 determining a data type of the secure hearing system data based on the data type identifier
104A selecting the data type from a set of data types including a first data type and a second data type
106 determining hearing system data
106A applying a security scheme to the secure hearing system data based on the data type
106AA applying a first security scheme in accordance with the data type being a first data type
106AB applying a second security scheme in accordance with the data type being a second data type
108 operating the hearing device according to the hearing system data
108A storing, in a fitting part of a memory module of the hearing device, fitting data of the hearing system data when the data type is of a first type indicative of the fitting data
108B operating control parameters of the hearing device according to control data of the hearing system data when the data type is of a second type indicative of the control data
200 method performed by a user accessory device of a hearing system comprising a hearing device system and an external device, the hearing device system comprising a hearing device and the user accessory device with a user application installed thereon
202 obtaining hearing system data
204 determining a data type of the hearing system data
206 assigning a data type identifier
208 generating secure hearing system data based on the data type identifier and the hearing system data, wherein the secure hearing system data comprises the data type identifier 208A applying a first security scheme in accordance with the data type being a first data type
208B applying a second security scheme in accordance with the data type being a second data type
210 transmitting the secure hearing system data to the hearing device
300 method performed by a server device of a hearing system comprising a hearing device system and the server device, the hearing device system comprising a hearing device and a user accessory device with a user application installed thereon
302 generating fitting data for the hearing device
304 generating secure fitting data based on the fitting data
306 transmitting the secure fitting data to the user accessory device

The invention claimed is:

1. A method, performed by a hearing device of a hearing system comprising a hearing device system and an external device, the hearing device system comprising the hearing device and a user accessory device with a user application installed thereon, the method comprising:
receiving, from the user accessory device, secure hearing system data, the secure hearing system data comprising a data type identifier;
determining a data type of the secure hearing system data based on the data type identifier;
determining hearing system data by applying a security scheme to the secure hearing system data based on the data type; and
performing an operation by the hearing device based on the hearing system data.

2. The method according to claim 1, wherein the act of applying the security scheme to the secure hearing system data based on the data type comprises applying a first security scheme if the data type is a first data type.

3. The method according to claim 2, wherein the first security scheme comprises a first integrity verification scheme and/or a first decryption scheme.

4. The method according to claim 2, wherein the act of applying the security scheme to the secure hearing system data based on the data type comprises applying a second security scheme if the data type is a second data type.

5. The method according to claim 4, wherein the second security scheme is different from the first security scheme.

6. The method according to claim 4, wherein the first security scheme comprises a first integrity verification scheme and/or a first decryption scheme, and wherein the second security scheme comprises a second integrity verification scheme and/or a second decryption scheme.

7. The method according to claim 4, wherein the second security scheme is the same as the first security scheme.

8. The method according to claim 1, wherein the act of determining the data type of the secure hearing system data comprises selecting the data type from a set of data types including a first data type and a second data type.

9. The method according to claim 8, wherein the first data type is indicative of fitting data and the second data type is indicative of control data.

10. The method according to claim 1, wherein the act of performing the operation by the hearing device based on the hearing system data comprises storing fitting data of the hearing system data when the data type is indicative of the fitting data.

11. The method according to claim 1, wherein the act of performing the operation by the hearing device according to the hearing system data comprises operating a control parameter of the hearing device based on control data of the hearing system data when the data type is indicative of the control data.

12. A hearing device configured to perform the method of claim 1.

13. A hearing device system comprising the hearing device of claim 12, and a user accessory device.

14. A hearing system comprising the hearing device system of claim 13 and an external device.

15. The method according to claim 1, wherein the act of determining the data type of the secure hearing system data comprises selecting the data type from a set of data types including a first data type indicating fitting data and a second data type indicating control data, the fitting data being for configuring the hearing device, the control data being for controlling an operation of the hearing device, wherein the security scheme is one of a plurality of security schemes including a first security scheme associated with the first data type and a second security scheme associated with the second data type, and wherein the first security scheme is configured to provide a higher security for the hearing device than the second security scheme.

16. A method, performed by a user accessory device of a hearing system comprising a hearing device system and an external device, the hearing device system comprising a hearing device and the user accessory device with a user application installed thereon, the method comprising:
obtaining hearing system data;
determining a data type of the hearing system data;
assigning a data type identifier;
generating secure hearing system data based on the data type identifier and the hearing system data, wherein the secure hearing system data comprises the data type identifier; and
transmitting the secure hearing system data to the hearing device.

17. The method according to claim 16, wherein the act of generating the secure hearing system data based on the data type identifier and the hearing system data comprises applying a first security scheme in accordance with the data type being a first data type, or applying a second security scheme in accordance with the data type being a second data type.

18. The method according to claim 16, wherein the act of determining the data type of the hearing system data comprises selecting the data type from a set of data types including a first data type indicating fitting data and a second data type indicating control data, the fitting data being for configuring the hearing device, the control data being for controlling an operation of the hearing device, wherein the first data type indicating the fitting data is associated with a first security scheme, wherein the second data type indicating the control data is associated with a second security scheme, wherein the first security scheme is configured to provide a higher security for the hearing device than the second security scheme.

19. A method, performed by a server device of a hearing system comprising a hearing device system and the server device, the hearing device system comprising a hearing device and a user accessory device with a user application installed thereon, the method comprising:
generating fitting data for the hearing device;
generating secure fitting data based on the fitting data; and
transmitting the secure fitting data to the user accessory device.

* * * * *